(12) United States Patent  (10) Patent No.: US 8,503,949 B2
Peczalski  (45) Date of Patent: Aug. 6, 2013

(54) MINIATURE FIBER RADIO TRANSCEIVER AND RELATED METHOD

(75) Inventor: Andrzej Peczalski, Eden Prairie, MO (US)

(73) Assignee: Honeywell International Inc., Morristown, NJ (US)

( * ) Notice: Subject to any disclaimer, the term of this patent is extended or adjusted under 35 U.S.C. 154(b) by 1025 days.

(21) Appl. No.: 12/288,335

(22) Filed: Oct. 17, 2008

(65) Prior Publication Data

US 2010/0097292 A1 Apr. 22, 2010

(51) Int. Cl.
*H04B 1/38* (2006.01)

(52) U.S. Cl.
USPC .......... 455/90.3; 455/550.1; 455/562.1; 361/737; 343/711; 343/720

(58) Field of Classification Search
USPC .......... 455/90.3, 347, 572, 575.7, 550.1, 455/562.1; 248/309.1–316.8; 343/904, 720, 343/711; 312/7.1; 361/737
See application file for complete search history.

(56) References Cited

U.S. PATENT DOCUMENTS

| | | | |
|---|---|---|---|
| 5,055,968 A * | 10/1991 | Nishi et al. | 361/737 |
| 5,493,305 A * | 2/1996 | Wooldridge et al. | 342/368 |
| 5,613,224 A * | 3/1997 | Auvray | 455/575.7 |
| 5,928,805 A | 7/1999 | Singh et al. | |
| 6,220,516 B1 * | 4/2001 | Tuttle et al. | 235/492 |
| 6,471,878 B1 * | 10/2002 | Greene et al. | 216/13 |
| 6,593,845 B1 * | 7/2003 | Friedman et al. | 340/10.33 |
| 6,807,853 B2 * | 10/2004 | Adamson et al. | 73/146 |
| 6,868,314 B1 * | 3/2005 | Frink | 701/3 |
| 7,455,829 B2 | 11/2008 | Eickhoff et al. | |
| 2004/0078662 A1 * | 4/2004 | Hamel et al. | 714/22 |
| 2005/0181245 A1 | 8/2005 | Bonne et al. | |
| 2006/0175208 A1 | 8/2006 | Eickhoff et al. | |
| 2007/0104996 A1 | 5/2007 | Eickhoff et al. | |
| 2007/0120522 A1 | 5/2007 | Eickhoff | |
| 2007/0124989 A1 | 6/2007 | Eickhoff et al. | |
| 2007/0160887 A1 | 7/2007 | Eickhoff | |
| 2007/0178340 A1 | 8/2007 | Eickhoff | |
| 2007/0184312 A1 | 8/2007 | Eickhoff | |
| 2007/0231618 A1 | 10/2007 | Eickhoff | |
| 2007/0264549 A1 | 11/2007 | Eickhoff et al. | |
| 2008/0030404 A1 * | 2/2008 | Irwin et al. | 342/372 |
| 2008/0107930 A1 | 5/2008 | Eickhoff et al. | |
| 2008/0131738 A1 | 6/2008 | Eickhoff | |
| 2008/0176608 A1 * | 7/2008 | Budampati et al. | 455/572 |
| 2008/0229748 A1 | 9/2008 | Elckhoff | |
| 2008/0268303 A1 | 10/2008 | Eickhoff | |
| 2010/0151344 A1 | 6/2010 | Otomaru et al. | |

OTHER PUBLICATIONS

"PowerFibers—Thin-Film Batteries on Fiber Substrate", ITN Energy Systems, 2003.*

(Continued)

*Primary Examiner* — Junpeng Chen

(57) ABSTRACT

A miniature fiber radio transceiver is disclosed that has an elongated form factor. In some embodiments, the form factor has the dimensions of one half of a millimeter by one half of a millimeter by fifty millimeters to give the transceiver an elongated shape similar to the shape of a single strand of hair. The miniature fiber radio transceiver may also include an energy source in the form of a piezoelectric fiber composite transducer having a plurality of elongated elastic piezoelectric fibers embedded in a composite material. The piezoelectric fibers can scavenge electrical energy from mechanical energy to generate charge pulses that provide the electrical energy for the operation of the transceiver.

20 Claims, 5 Drawing Sheets

OTHER PUBLICATIONS

"A 65 uW, 1.9 GHz RF to Digital Baseband Wakeup Receiver for Wireless Sensor Nodes", N. Pletcher, S. Gambini, J. Rabaey, UC Berkeley, IEEE Custom Integrated Circuits Conference, Sep. 2007.*

"Direct Sequence Ultra Wideband System Design for Wireles Sensor Network", Azim et al, National University of MaLaysia, IEEE Computers and Communications Engineering, May 2008.*

Bernd J. Neudecker, et al., "Power Fibers: Thin-Film Batteries on Fiber Substrates", ITN Energy Systems, Inc., 9 pages.

Martin H. Benson, et al., "Powerfiber for Flexible Fabric and Rigid Composite Applications", ITN Energy Systems, Inc., 3 pages.

Bernd J. Neudecker, et al., "PowerFibers-Thin-Film Batteries on Fiber Substrate", ITN Energy Systems, Inc., 17 pages.

Bernd J. Neudecker, et al., "PowerFibers: Thin-Film Batteries on Fiber Substrates", ITN Energy Systems, Inc., 14th International Conference on Composite Materials, Jul. 14-18, 2003, 1 page.

Alan B. Dalton, et al., "Super Tough Carbon Nanotube Composite Fibers for Electronic Textiles", 5 pages.

Muhammad A. Qidwai, et al., "Design and Performance of Composite Multifunctional Structure-Battery Materials", 17th American Society for Composites Conference, aper #141, Oct. 2002, 8 pages.

M. A. Qidwai, et al., "Excel Computational Design Tool: Multifunctional Structure-Battery Materials", Jan. 22, 2002, 17 pages.

"Paper battery", http://en.wikipedia.org/wiki/Paper_battery, Nov. 18, 2008, 2 pages.

"Soft Battery-Thin and flexible battery for new disposable applications", 2007, 3 pages.

"U10007 Thin Cell", Technical Datasheet, UltraLife Batteries, 2006, 2 pages.

"Solicore", Flexion Battery, SF-4823 Specifications, Feb. 8, 2008, 4 pages.

"Solicore", Flexion Battery, SF-2529 Specifications, Feb. 8, 2008, 4 pages.

James P. Thomas, et al., "Multifuctional Structure-Battery Materials for Enhanced Performance in Small Unmanned Air Vehicles", Proceedings of IMECE2003: International Mechanical Engineering Congress and R&D Exposition, Nov. 15-21, 2003, 2 pages.

Andrzej M. Peczalski, et al., "Miniature Powered Antenna for Wireless Communications and Related System and Method", U.S. Appl. No. 12/350,086, filed Jan. 7, 2009.

* cited by examiner

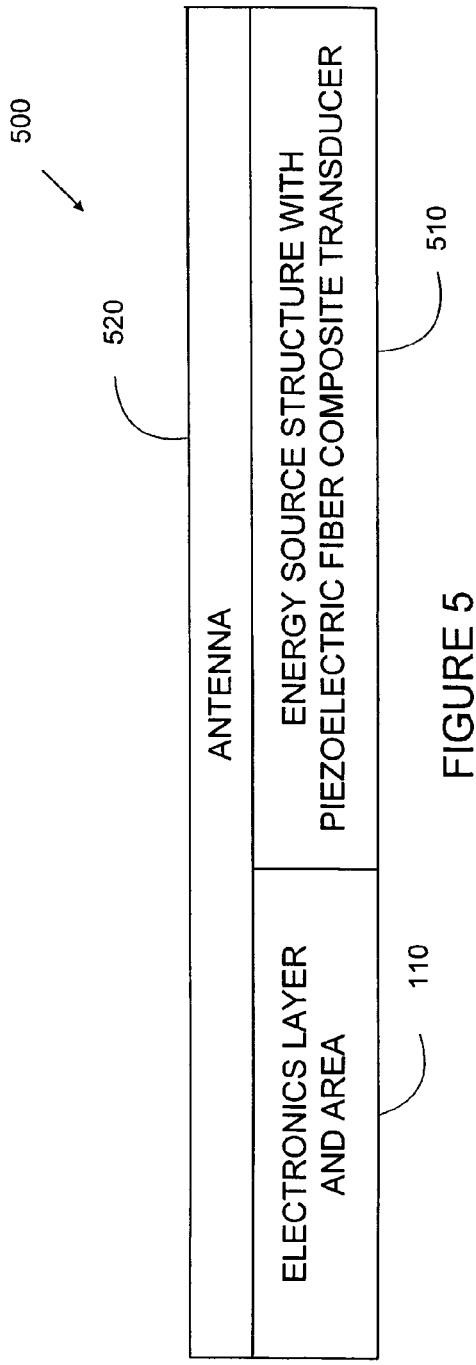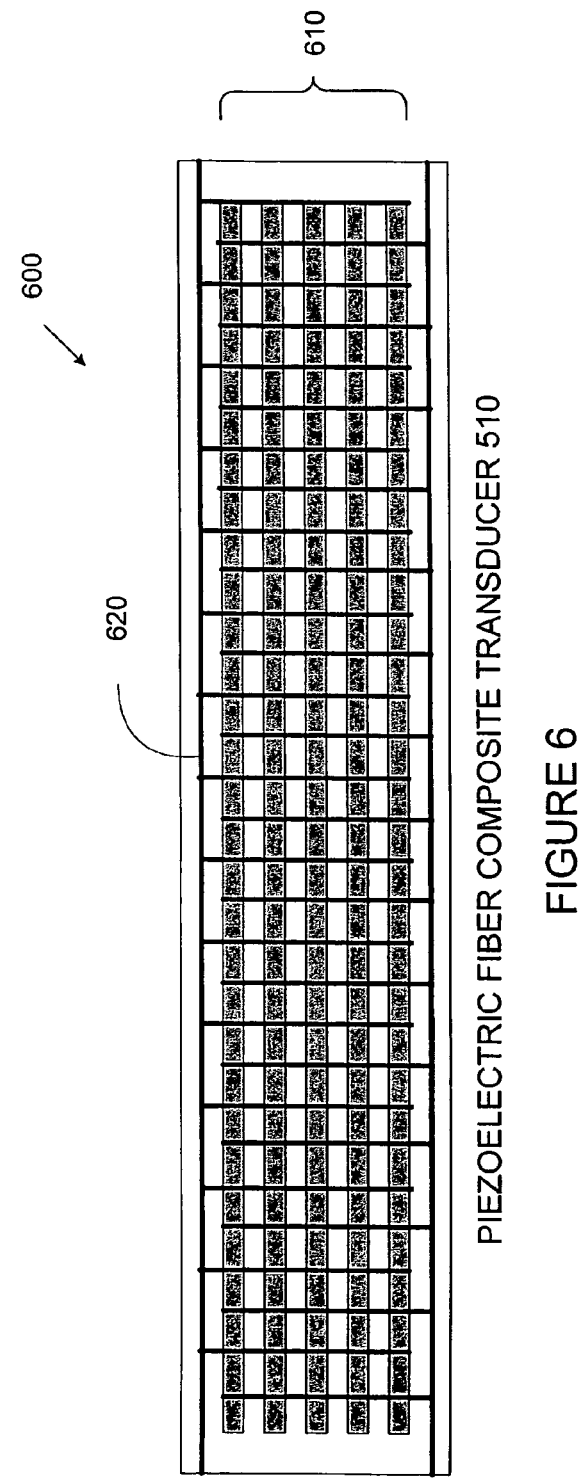

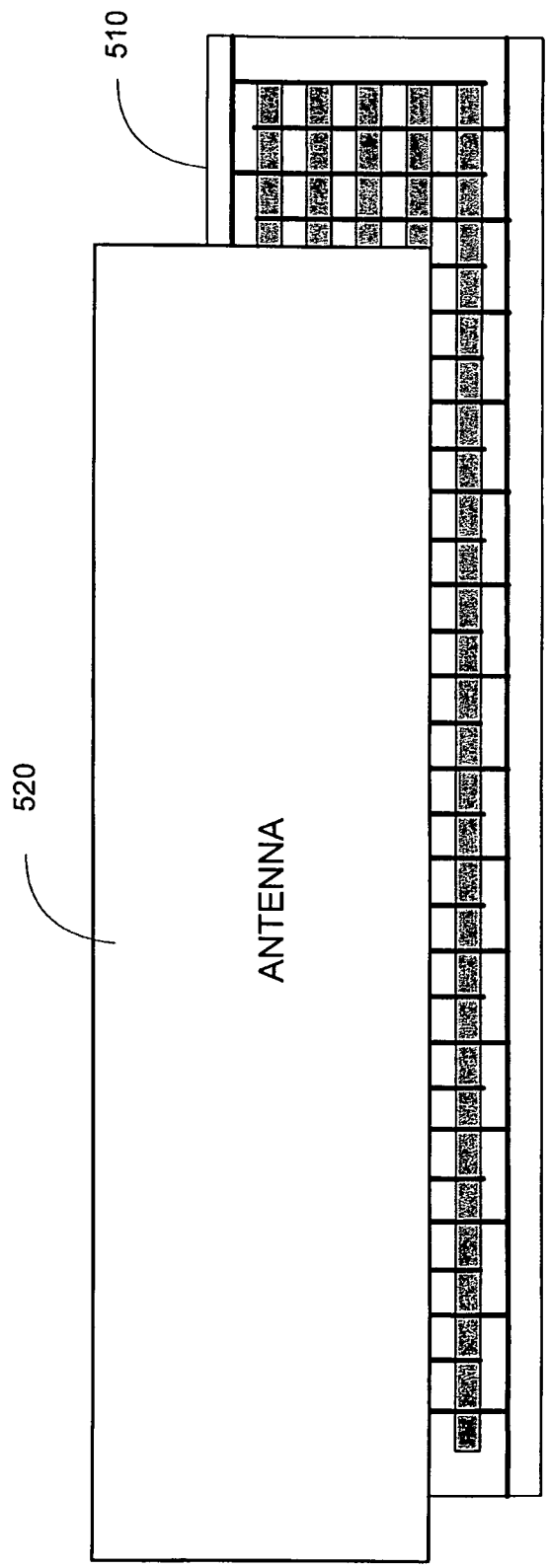

MINIATURE FIBER RADIO TRANSCEIVER AND RELATED METHOD

TECHNICAL FIELD

This disclosure is directed, in general, to wireless communication devices and, in particular, to a miniature fiber radio transceiver and related method.

BACKGROUND

Miniaturized radio frequency transceivers have been used for many different types of applications. Miniaturized radio frequency transceivers may be used to provide a radio beacon to signal for assistance. For example, firefighters who battle dangerous fires may be provided with miniaturized radio frequency transceivers to provide location information. The small size and weight of a miniaturized radio frequency transceiver makes it practical for a firefighter to carry the transceiver on his or her person during firefighting operations.

Miniaturized radio frequency transceivers have also been used to provide emergency radio beacons for elderly persons. For example, a miniaturized radio frequency transceiver may be placed on an elderly person who suffers from cognitive disability due to Alzheimer's disease or other similar ailments. The transceiver can send a radio beacon that constantly reports the elderly person's location. Miniaturized radio frequency transceivers are further useful in military applications. Military personnel who may be subject to capture by an enemy may be provided with a miniaturized radio frequency transceiver that would be difficult for the enemy to detect. In addition, miniaturized radio frequency transceivers may be used in portable radio wireless networks. For most wireless operation, a miniature radio frequency transceiver often must have its own energy source.

Manufacturing a miniaturized radio frequency transceiver presents many technical challenges.

SUMMARY OF THE INVENTION

This disclosure provides a miniature fiber radio transceiver and related method.

In some embodiments, a miniature fiber radio transceiver has a unique elongated form factor. For example, the form factor could have dimensions of one half of a millimeter (0.5 mm) by one half of a millimeter (0.5 mm) by fifty millimeters (50 mm). The elongated form factor of the miniature fiber radio transceiver could have an elongated shape similar to the shape of a single strand of hair.

In particular embodiments, the miniature fiber radio transceiver may comprise an energy source, such as a piezoelectric fiber composite transducer. The piezoelectric fiber composite transducer could include a plurality of elongated piezoelectric fibers (and their electrodes) that are embedded in a composite material. The piezoelectric fibers may be elastic and can scavenge electrical energy from mechanical energy. For example, each time the piezoelectric fibers are bent with respect to their straight line positions, the piezoelectric fibers can generate a charge pulse. The charge pulses can provide electrical energy for operating the miniature fiber radio transceiver. Other energy sources (e.g., battery, fuel cell) can be configured in the fiber shape.

Other technical features may be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in conjunction with the accompanying drawings, wherein like numbers designated like objects, and in which:

FIG. 5 illustrates an example miniature fiber radio transceiver with a piezoelectric fiber composite transducer according to this disclosure;

FIG. 6 illustrates a more detailed view of the piezoelectric fiber composite transducer in the example miniature fiber radio transceiver of FIG. 5 according to this disclosure;

FIG. 7 illustrates an example miniature fiber radio transceiver illustrating an antenna placed over a piezoelectric fiber composite transducer according to this disclosure.

DETAILED DESCRIPTION

FIGS. 1 through 8 and the various embodiments used to describe the principles of the present invention in this patent document are by way of illustration only and should not be construed in any way to limit the scope of the invention. Those skilled in the art will understand that the principles of the invention may be implemented in any type of suitably arranged miniature fiber radio transceiver circuit.

Figure 1:
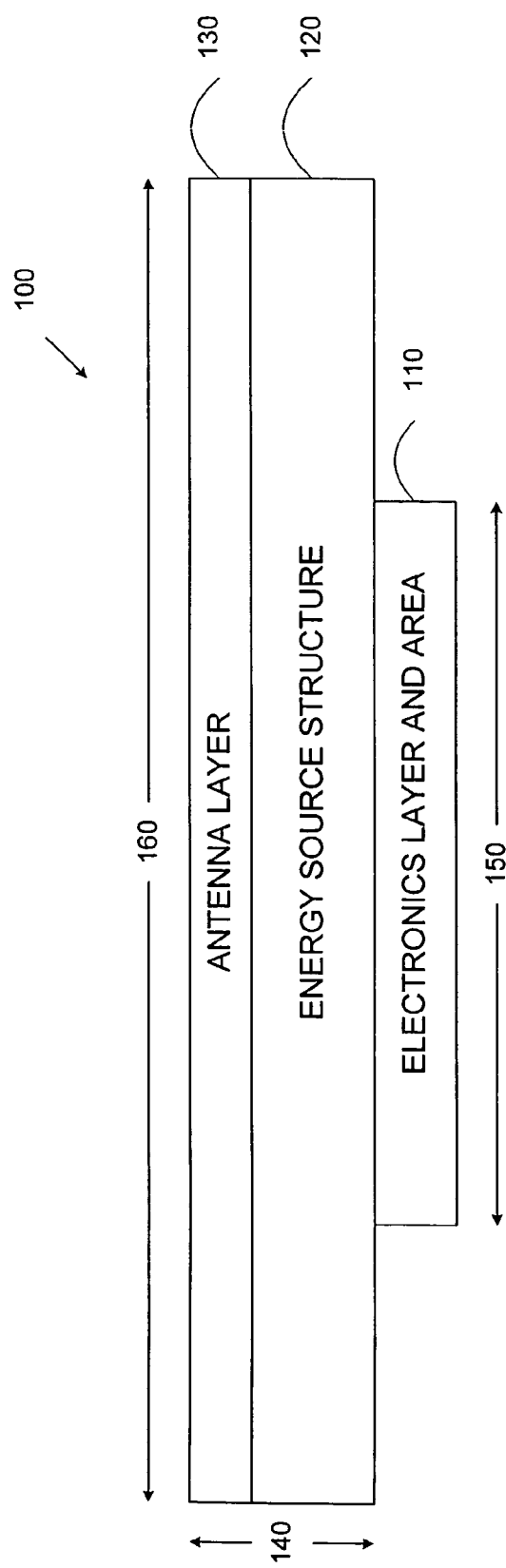
FIG. 1 illustrates an example miniature fiber radio transceiver according to this disclosure.

FIG. 1 illustrates an example miniature fiber radio transceiver 100 according to this disclosure. The embodiment of the miniature fiber transceiver 100 shown in FIG. 1 is for illustration only. Other embodiments of the miniature fiber transceiver 100 could be used without departing from the scope of this disclosure.

In this example, the miniature fiber transceiver 100 is manufactured on an energy source structure that serves as a thin flex circuit board. The external layer of the energy source structure may be made of plastic or some other material that is suitable for a circuit board that supports integrated circuit electronic devices.

The miniature fiber transceiver 100 comprises three general parts: an electronics layer and area 110, an energy source structure 120, and an antenna layer 130. These three areas are described in more detail below. In an advantageous embodiment of the miniature fiber transceiver 100 the antenna area 130 overlays the energy source structure 120 (as opposed to being located laterally with respect to the energy source structure 120). In many cases the antenna comprises a metal layer printed or otherwise deposited on any side of the energy source structure 120.

The miniature fiber transceiver 100 has a unique elongated form factor. In some embodiments, the form factor has the dimensions of one half of a millimeter (0.5 mm) by one half of a millimeter (0.5 mm) by fifty millimeters (50 mm). The shape of certain antennas is elongated and narrow (e.g., dipole antenna). Thus the other elements of the miniature fiber transceiver 100 may take the same elongated and narrow shape that is similar to a hair or a fiber. That is, the form factor of the transceiver 100 has an elongated shape similar to the shape of a single strand of hair.

However, the elongated form factor of the transceiver 100 is not limited to the dimensions set forth above, and the elongated form factor can have other numerical dimensions. For example, the elongated form factor can have the dimensions of four tenths of a millimeter (0.4 mm) by four tenths of a millimeter (0.4 mm) by thirty millimeters (30 mm). The length of the antenna and therefore the length of the transceiver is dictated by the radio frequency of operation (i.e., approximately half of the radio wavelength. In other cases it may be a quarter of the wavelength or multiple halves of the wavelength. In each case, the elongated form factor of the dipole antenna (e.g., length to width ratio of about fifty to one (50:1)) causes the transceiver 100 to have an elongated shape similar to the shape of a single strand of hair.

It is understood that the schematic block diagram of the miniature fiber transceiver 100 that is shown in FIG. 1 is not drawn to scale. The three portions of the miniature fiber transceiver 100 are not drawn to scale for purposes of clarity of explanation. In one advantageous embodiment of the invention, the height 140 of the miniature fiber transceiver 100 (not including the electronics) is four tenths of a millimeter (0.4 mm). The width (not shown in FIG. 1) is also four tenths of a millimeter (0.4 mm). A typical length 150 of the electronics layer and area 110 may be in a range from four millimeters (4.0 mm) to six millimeters (6.0 mm). A typical height of the electronics layer and area 110 is one half of a millimeter (0.5 mm). A typical length 160 of the energy source structure 120 may be as long as the antenna in order to maximize stored energy (e.g., fifty millimeters (50.0 mm)) which corresponds approximately to the radio frequency of one and six tenths Gigahertz (1.6 GHz).

Figure 2:
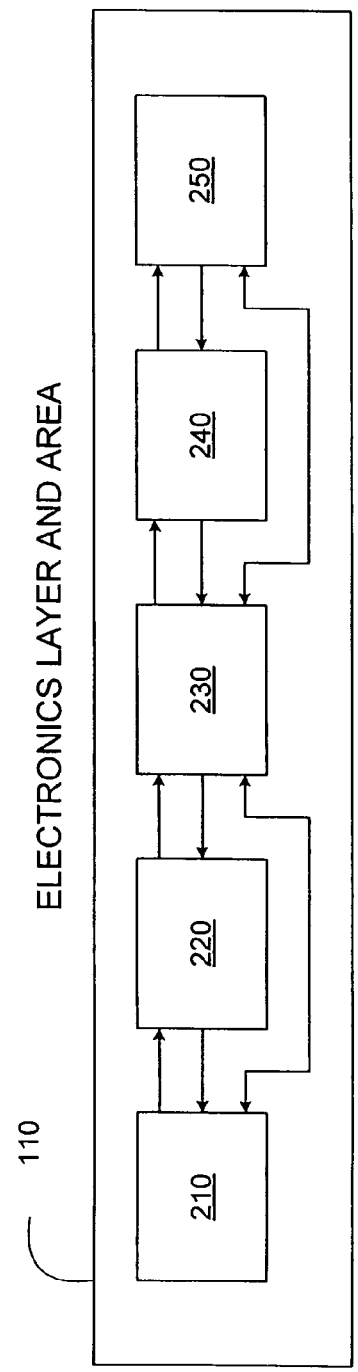
FIG. 2 illustrates a more detailed view of the electronics layer and area in the example miniature fiber radio transceiver of FIG. 1 according to this disclosure.

FIG. 2 illustrates a more detailed view of the electronics layer and area 110 in the example miniature fiber radio transceiver 100 of FIG. 1 according to this disclosure. The electronics layer and area 110 can include state of the art miniature electronic components. In this example, the blocks 210, 220, 230, 240 and 250 schematically represent electronic components of the transceiver 100, such as integrated circuits, capacitors, radio frequency resonators, multilayer metal interconnect printing, vertical interconnects, integrated circuit chip thinning, surface mounting, and passivation materials. The chips and packages may be made thinner than is customary for other common applications. The electronic components are mounted on the cover of the energy source structure 120 and are electrically interconnected to the antenna layer 130 and the energy source electrodes.

In this example, the electronics components in the electronics layer and area 110 include the transmitter portion and the receiver portion and the electric power conditioning circuits of the fiber transceiver 100. In some embodiments, the fiber transceiver 100 employs a direct sequence spread spectrum waveform that is relatively resistant to multipath errors. An on-off key modulation can be used for a low power and less complex receiver.

In one embodiment the transceiver 100 is a transmitter that transmits spread spectrum messages. The receiver that is not part of the transceiver 100 sweeps a pseudorandom code in the time and frequency domains to find the correlation with the receiver. The transmitter of the transceiver 100 can also broadcast multiple pulses, 1.6 MHz apart with the same modulation. The transmitter of the transceiver 100 provides 1600 repetitions of the code with different phase within one millisecond (1 msec) to the receiver with a long enough time for the best correlation. In addition, the transmitter of the transceiver 100 may use a matched radio frequency (RF) micro-electro-mechanical systems (MEMS) resonator for stable carrier frequency and chip rate for easy frequency tracking by the receiver. Beyond that, the receiver employs a high gain directional antenna.

The transceiver 100 may comprise a receiver that may employ a design that is described in an article by N. Pletcher, S. Gambini and J. Rabaey entitled "A 65 µW, 1.9 GHz RF to Digital Baseband Wakeup Receiver for Wireless Sensor Nodes" published in Custom Integrated Circuits Conference, pp. 539-543, Sep. 16-19, 2007 (which is hereby incorporated by reference). The ultra-low power wake-up receiver of the transceiver 100 may wake up and look for the in-phase code (that is one thousand chips long) for one millisecond (1 msec) every one second (1 sec). The chip rate can be derived from the carrier frequency for precise correlation. The in-phase code gives a correlation signal thirty decibels (30 dB) above uncorrelated power arriving at the receiver (e.g., −55 dBm). The receiver of the transceiver 100 can provide a signal to noise ratio of ten decibels (10 dB) and a processing gain of twenty decibels (20 dB). With those assumptions the link range can be over one hundred meters (100 m) in a medium clutter environment. Note, however, that these details regarding the transmitter and receiver in the transceiver 100 are for illustration only and that other transmitters or receivers could be used.

The energy source that is located in the energy source structure 120 of the transceiver 100 may comprise any suitable power source(s). Examples include a thin film battery, a fuel cell, or a piezoelectric fiber composite transducer circuit. These three different energy sources may be provided in the elongated form factor of the transceiver 100.

Figure 3:
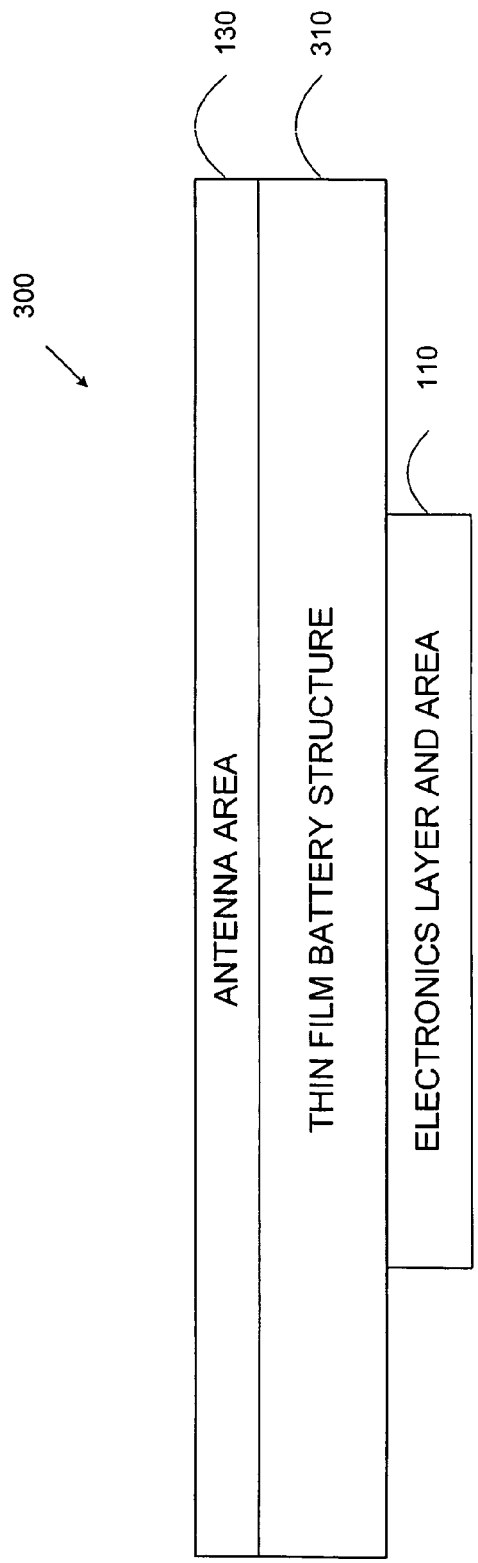
FIG. 3 illustrates an example miniature fiber radio transceiver with a thin film battery according to this disclosure.

FIG. 3 illustrates an example miniature fiber radio transceiver 300 with a thin film battery structure 310 according to this disclosure. In some embodiments, the thin film battery structure 310 may employ a design that is described in an article by B. J. Neudecker, M. H. Benson, and B. K. Emerson entitled "Power Fibers: Thin-Film Batteries on Fiber Substrates" published by ITN Energy Systems, Inc. of Littleton, Colo. in the Fourteenth International Conference on Composite Materials (ICCM 14), Jul. 14-18, 2003 (which is hereby incorporated by reference).

In particular embodiments, the thin film battery structure 310 may include a rechargeable battery having an energy density of one hundred (100) to two hundred (200) microamperes per hour per square centimeter ($\mu A\ hr/cm^2$) (0.4 to 0.8 milliwatt hour per square centimeter ($mWhr/cm^2$)). In other particular embodiments, the thin film battery structure 310 may include a non-rechargeable battery having an energy density of two thousand (2000) to three thousand (3000) microamperes per hour per square centimeter ($\mu A\ hr/cm^2$) (3.0 to 4.5 milliwatt hour per square centimeter ($mWhr/cm^2$).

Figure 4:
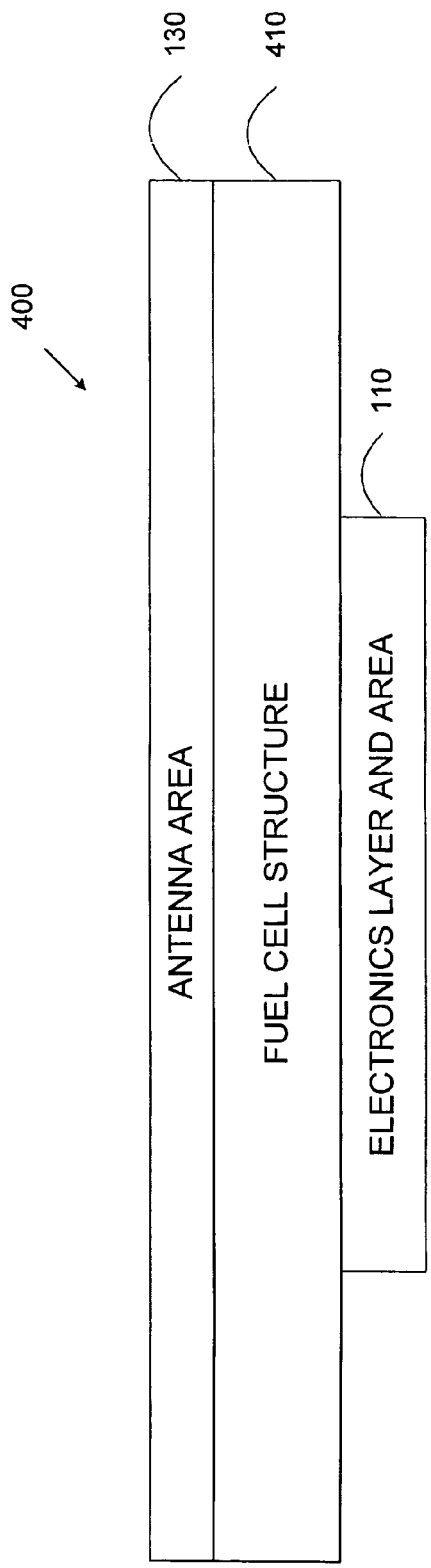
FIG. 4 illustrates an example miniature fiber radio transceiver with a fuel cell according to this disclosure.

FIG. 4 illustrates an example miniature fiber radio transceiver 400 with a fuel cell structure 410 according to this disclosure. The fuel cell structure 410 may be capable of storing more energy than a rechargeable battery or a non-rechargeable battery. For example, a typical rechargeable battery in the fiber form factor may have an energy density of four tenths (0.4) of a milliwatt hour per square centimeter ($mWhr/cm^2$). A typical non-rechargeable battery in the fiber form factor may have an energy density of three (3.0) milliwatts hour per square centimeter ($mWhr/cm^2$). A typical fuel cell in the fiber form factor has an energy density of twenty (20.0) milliwatts hour per square centimeter ($mWhr/cm^2$).

In particular embodiments, then the transceiver 400 is powered by the fuel cell structure 410, the transceiver 400 can operate as a receiver for up to five hundred (500) days if there is no significant activity. In other particular embodiments, the radio frequency (RF) transceiver 400 can operate in the transmitter function for up to one hundred (100) days if the transmitter powers up four (4) times a day at twenty five (25) milliwatts (mW) for one millisecond (1 msec).

In yet other particular embodiments, the radio frequency (RF) transceiver 400 can also operate as a receiver for up to one hundred (100) days if the transmitter creates up to thirteen (13) pulses of two hundred (200) milliamperes (mA) of one millisecond (1 msec) duration. This assumes that a forty seven microfarad (47 µF) capacitor is integrated on the fiber transceiver 400.

In still other particular embodiments, the radio frequency (RF) transceiver 400 can operate as a receiver for up to one hundred (100) days if the transmitter creates up to eight (8) pulses of one and one half amperes (1.5 A) of one second (1 sec) duration. This assumes that a three hundred eighty millifarad (380 mF) capacitor (such as one having a size of six millimeters (6 mm) by thirty millimeters (30 mm) by forty eight millimeters (48 mm)) is used, which may or may not be integrated into the fiber transceiver 400.

FIG. 5 illustrates a schematic block diagram of an exemplary miniature fiber transceiver 500 of the invention with an energy source that comprises a piezoelectric fiber composite transducer 510. In one advantageous embodiment of the transceiver 500 of the invention, the length of the electronics layer and area 110 is approximately four millimeters (4 mm) to six millimeters (6 mm) long. The length of the piezoelectric fiber composite transducer 510 is approximately thirty millimeters (30 mm) long.

The piezoelectric fiber composite transducer 510 may include a plurality of elongated piezoelectric fibers (and their electrodes) that are embedded in a composite material, and the piezoelectric fibers may be elastic. The piezoelectric fibers scavenge electrical energy from mechanical energy. For example, each time that the piezoelectric fibers are bent with respect to their straight line position, the piezoelectric fibers can generate a charge pulse. Another pulse is generated when the fiber is brought back to the straight line position. The charge pulses provide the electrical energy for operating the miniature fiber transceiver 500.

For example, consider the mechanical resonant frequency of a piezoelectric fiber composite transducer 510 having an elongated form factor of one half of one millimeter (0.5 mm) by one half of one millimeter (0.5 mm) by twelve centimeters (12.0 cm). Eight hundred thirty three microjoules (833 µJ) of energy is required for twenty five milliwatts (25 mW) transmitted over ten milliseconds (10 msec) and thirty percent (30%) overall efficiency of power conversion and transmitter.

With the present fiber design one needs ten (10) flexes of fifty (50) fibers or one hundred twenty five (125) flexes of four (4) fibers (the maximum number for fiber radio size).

FIG. 6 illustrates a more detailed view of the piezoelectric fiber composite transducer 510 in the example miniature fiber radio transceiver 500 of FIG. 5 according to this disclosure. In this example, five (5) piezoelectric fibers are shown (collectively numbered with reference numeral 610). It is understood that the transducer 510 is not limited to the five piezoelectric fibers that are shown. The use of five fibers is merely illustrative. The electrode connections 620 of the piezoelectric fibers are also shown in FIG. 6.

FIG. 7 illustrates a portion of the exemplary miniature fiber radio transceiver 500 showing how the antenna 520 is placed over a piezoelectric fiber composite transducer 520. The antenna 520 may be a straight antenna, a folded dipole antenna, or any other suitable antenna configuration. A folded dipole antenna may have less sensitivity to surrounding metal components. The antenna 520 may be printed on external layer of the energy source structure 510. As shown in FIG. 7, the overlay of a metal forms a dipole antenna 520 on the piezoelectric fiber composite transducer 510. The antenna 520 is connected to the circuitry in the electronics layer and area 110 by metal connectors (not shown in FIG. 7).

Although FIGS. 1 through 7 illustrate various examples of miniature fiber radio transceivers, various changes may be made to FIGS. 1 through 7. For example, a miniature fiber radio transceiver could include any number of electronics areas, energy source areas, and antenna areas. Also, any suitable source(s) of power could be used to power the miniature fiber radio transceiver.

Figure 8:
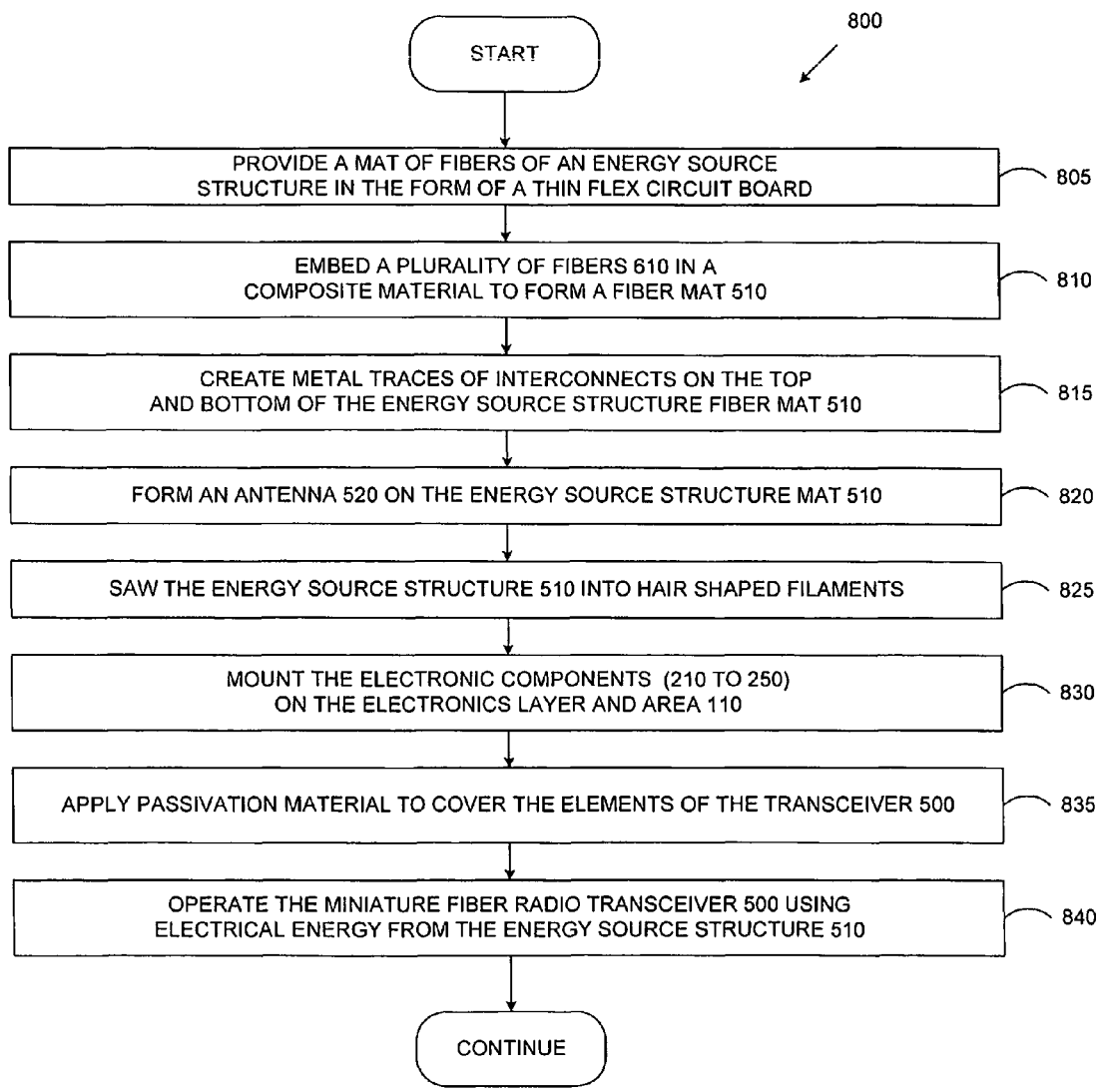
FIG. 8 illustrates an example method for forming and using a miniature fiber radio transceiver according to this disclosure.

FIG. 8 illustrates an examplary method 800 for forming and using a miniature fiber radio transceiver according to this disclosure. The embodiment of the method 800 shown in FIG. 8 is for illustration only. Other embodiments of the method 800 could be used without departing from the scope of this disclosure.

In the first step a fiber or mat of fibers that comprise an energy source structure is provided in the form of a thin flex circuit board (step 805). Then a plurality of fibers 610 are embedded in a composite material to form a fiber mat 510 (step 810).

Metal traces of interconnects are created on the top and bottom of the energy source structure fiber mat 510 (step 815). An antenna 520 is formed on the energy source structure mat 510 (step 820). The energy source structure mat 510 that contains the piezoelectric fiber composite transducer 510 and the antenna 520 is sawed into hair-shaped filaments (step 825).

The electronic components (210 to 250) are mounted in the electronics layer and area 110 (step 830). Passivation material is applied to cover the elements of the transceiver 500 (step 835). The miniature fiber radio transceiver 500 is operated using electrical energy from the energy source structure 120 (step 840).

Although FIG. 8 illustrates an example method 800 for forming and using a miniature fiber radio transceiver, various changes may be made to FIG. 8. For example, while the use of the piezoelectric fiber composite transducer 510 as a power source is shown, any other or additional power source(s) could be used. Also, a miniature fiber radio transceiver could be formed in any other suitable manner. In addition, while shown as a series of steps, various steps in FIG. 8 may overlap, occur in parallel, occur multiple times, or occur in a different order.

It may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The term "transceiver" includes the case when both a receiver and a transmitter are present and the case where just a receiver is present and the case where just a transmitter is present. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of the invention, as defined by the following claims.

What is claimed is:

1. A miniature fiber radio frequency transceiver comprising:
   electronic transceiver circuitry;
   an energy source; and
   an antenna;
   wherein the miniature fiber radio frequency transceiver has an elongated form factor with a length-to-width ratio of at least about 50:1 and a length-to-height ratio of at least about 50:1.

2. The miniature fiber radio frequency transceiver as set forth in claim 1, wherein the elongated form factor has a shape of a single hair.

3. The miniature fiber radio frequency transceiver as set forth in claim 1, wherein the elongated form factor has a height of approximately one half of a millimeter, a width of approximately one half of a millimeter, and a length of approximately fifty millimeters.

4. The miniature fiber radio frequency transceiver as set forth in claim 1, wherein the electronic transceiver circuitry comprises a transmitter and a receiver.

5. The miniature fiber radio frequency transceiver as set forth in claim 1, wherein the energy source comprises a battery.

6. The miniature fiber radio frequency transceiver as set forth in claim 1, wherein the energy source comprises a fuel cell.

7. The miniature fiber radio frequency transceiver as set forth in claim 1, wherein the energy source comprises a piezoelectric fiber transducer.

8. The miniature fiber radio frequency transceiver as set forth in claim 7, wherein the piezoelectric fiber transducer comprises a plurality of piezoelectric fibers configured to generate a charge pulse when the fibers are bent with respect to a straight line position.

9. The miniature fiber radio frequency transceiver as set forth in claim 1, wherein the electronic transceiver circuitry comprises:
   a direct sequence spread spectrum transmitter; and
   a sixty five microwatt, one and nine tenths Gigahertz radio frequency to digital baseband wakeup receiver.

10. A miniature fiber radio frequency transceiver comprising:
    an electronics area that comprises at least one of: a radio frequency transmitter and a radio frequency receiver;
    an energy source area that comprises a source of electrical energy; and
    an antenna area that comprises an antenna for at least one of: transmitting and receiving radio frequency waveforms;
    wherein the miniature fiber radio frequency transceiver has an elongated form factor with a length-to-width ratio of at least about 50:1 and a length-to-height ratio of at least about 50:1.

11. The miniature fiber radio frequency transceiver as set forth in claim 10, wherein the electronics area, the energy source area, and the antenna area each have an elongated form factor.

12. The miniature fiber radio frequency transceiver as set forth in claim 11, wherein the electronics area has a form factor that has dimensions of one half of a millimeter by one half of a millimeter by six millimeters.

13. The miniature fiber radio frequency transceiver as set forth in claim 10, wherein the source of electrical energy in the energy source area is a piezoelectric fiber transducer.

14. The miniature fiber radio frequency transceiver as set forth in claim 13, wherein the antenna overlays the piezoelectric fiber transducer.

15. The miniature fiber radio frequency transceiver as set forth in claim 14, wherein the antenna that overlays the piezoelectric fiber transducer comprises one of: a straight antenna and a folded dipole antenna.

16. The miniature fiber radio frequency transceiver as set forth in claim 13, wherein the piezoelectric fiber transducer is configured to generate electrical energy for each bending of the piezoelectric fibers.

17. A method for manufacturing a miniature fiber radio frequency transceiver, the method comprising:
    providing an energy source structure having a form of a fiber or mat of fibers;
    creating metal traces of interconnects on a top and a bottom of the energy source structure;
    forming an antenna of the metal traces on the energy source structure; and
    coupling electronic transceiver circuitry to the antenna and the energy source structure;
    wherein the miniature fiber radio frequency transceiver has an elongated form factor with a length-to-width ratio of at least about 50:1 and a length-to-height ratio of at least about 50:1.

18. The method as set forth in claim 17, further comprising:
    sawing the mat of fibers into a plurality of hair shaped filaments.

19. The method as set forth in claim 18, wherein coupling the electronic transceiver circuitry to the antenna and the energy source structure comprises:
    mounting electronic components of a radio frequency transceiver on the metal traces; and
    applying passivation material to cover the electronics components, the antenna, and the energy source structure of the radio frequency transceiver.

20. The method as set forth in claim 19, further comprising:
    operating the miniature fiber radio transceiver using electrical energy from the energy source structure.

* * * * *